United States Patent
Pradzynski et al.

(10) Patent No.: US 8,756,645 B2
(45) Date of Patent: Jun. 17, 2014

(54) UNIVERSAL MULTIPLE-BAND DIGITAL MODULES FOR CATV UPSTREAM AND DOWNSTREAM WITH SAMPLING RATE AS FUNCTION OF BANDWIDTH

(75) Inventors: Krzysztof Pradzynski, Santa Clara, CA (US); Sudhesh Mysore, Carlsbad, CA (US); Oleh Sniezko, Highlands Ranch, CO (US)

(73) Assignee: Aurora Networks, Inc., Santa Clara, CA (US)

( * ) Notice: Subject to any disclaimer, the term of this patent is extended or adjusted under 35 U.S.C. 154(b) by 0 days.

(21) Appl. No.: 13/525,591

(22) Filed: Jun. 18, 2012

(65) Prior Publication Data

US 2013/0160068 A1    Jun. 20, 2013

Related U.S. Application Data

(60) Provisional application No. 61/571,068, filed on Jun. 17, 2011, provisional application No. 61/573,669, filed on Sep. 9, 2011.

(51) Int. Cl.
*H04N 7/173* (2011.01)
*H04N 5/40* (2006.01)
*G06F 15/16* (2006.01)

(52) U.S. Cl.
USPC ........... 725/127; 725/119; 725/132; 725/149; 455/140; 455/177.1

(58) Field of Classification Search
CPC ..... H04N 7/104; H04N 11/006; H04N 9/797; H04L 27/362
USPC ........... 725/129, 128, 28, 120, 121, 127, 119, 725/146, 149, 132; 455/140, 142, 177.1
See application file for complete search history.

(56) References Cited

U.S. PATENT DOCUMENTS

| | | | | |
|---|---|---|---|---|
| 5,864,672 | A * | 1/1999 | Bodeep et al. | 725/126 |
| 7,389,528 | B1 * | 6/2008 | Beser | 725/111 |
| 2005/0141406 | A1 * | 6/2005 | Maltsev et al. | 370/203 |
| 2007/0086544 | A1 * | 4/2007 | Fudge et al. | 375/316 |
| 2007/0157278 | A1 * | 7/2007 | Geile et al. | 725/119 |
| 2008/0013653 | A1 * | 1/2008 | Fudge et al. | 375/345 |
| 2008/0068512 | A1 * | 3/2008 | Sharma et al. | 348/724 |
| 2009/0113510 | A1 * | 4/2009 | Knutson et al. | 725/127 |
| 2011/0072475 | A1 * | 3/2011 | McKiel, Jr. | 725/100 |
| 2011/0182583 | A1 * | 7/2011 | Rakib | 398/67 |
| 2012/0180101 | A1 * | 7/2012 | Davis et al. | 725/116 |
| 2013/0160068 | A1 * | 6/2013 | Pradzynski et al. | 725/121 |

FOREIGN PATENT DOCUMENTS

| | | |
|---|---|---|
| WO | 00/51270 | 8/2000 |
| WO | 2005/125063 | 12/2005 |

OTHER PUBLICATIONS

Notification, International Search Report and Written Opinion from PCT/US2012/042912, dated Apr. 3, 2013.

* cited by examiner

*Primary Examiner* — Pankaj Kumar
*Assistant Examiner* — Reuben M Brown
(74) *Attorney, Agent, or Firm* — John Bruckner PC

(57) ABSTRACT

Configuring a generic adaptable reconfigurable digital receiver having a programmable signal conditioner includes specifying a number of output RF channels; specifying an RF bandwidth of an output channel; and selecting a digital to analog sampling rate of a digital to analog convertor of the programmable signal conditioner as a function of the RF bandwidth of the output channel using a processor/demux of the generic adaptable reconfigurable digital receiver.

20 Claims, 12 Drawing Sheets

UNIVERSAL MULTIPLE-BAND DIGITAL MODULES FOR CATV UPSTREAM AND DOWNSTREAM WITH SAMPLING RATE AS FUNCTION OF BANDWIDTH

CROSS-REFERENCE(S) TO RELATED APPLICATION(S)

This application claims a benefit of priority under 35 U.S.C. 119(e) from provisional patent application U.S. Ser. No. 61/571,068, filed Jun. 17, 2011 and U.S. Ser. No. 61/573,669, filed Sep. 9, 2011, the entire contents of both of which are hereby expressly incorporated herein by reference for all purposes.

BACKGROUND INFORMATION

1. Field of the Invention

Advantages of Digital CATV Return Path

To offer ever higher speed data services to meet the increased demand, cable operators are rolling out DOCSIS 3.0 services to connect homes and businesses. DOCSIS 3.0 allows upstream and downstream "channel bonding" that enables data connection speeds as high as 100 Mb/s in the downstream direction. Data services to home subscribers have historically been "asymmetrical", with upstream data speeds lower than downstream data speeds. However, as cable operators serve more and more small businesses, it has become imperative to offer symmetrical data speeds up to and in excess of 100 Mb/s.

DOCSIS 3.0 systems allow cable operators to provide speeds up to 120 Mb/s or up to 240 Mb/s in the upstream path as well, depending on bandwidth allocated to upstream communication, matching the downstream speeds and allowing for the provision of symmetrical (100 Mb/s) data services. This requires a full implementation of DOCSIS 3.0 services in the upstream, including the bonding of four or eight 6.4 MHz channels as well as increasing the modulation level from the previously deployed 16-QAM to 64-QAM. This upgrade allows for higher upstream data speeds but also dramatically increases the performance required of the upstream lasers. Industry also announced further increases in the upstream speed to up to 360 Mb/s and 480 Mb/s. These further increases are allowed by expansion of the upstream bandwidth from 5-45 MHz or 5-65 MH to 5-85 MHz and by increasing modulation levels to 256-QAM. These capacity increases may be supported with any service platform such as DOCSIS platform or any other platform that uses frequency division multiplexed signals.

Cable operators are discovering that many of their older analog return links are unable to support these higher performance requirements. They are increasingly turning to digital upstream links that provide superior signal-to-noise performance, higher dynamic range and a much larger power budget to ensure that the current, increased service deployments and future broadband upgrades with DOCSIS 3.0 or other platform can be supported.

Digital links also do not degrade in quality with increasing link lengths and decreasing RF signal level (for signal levels above the receiver sensitivity) and also simplify the design, alignment and maintenance of the return path of hybrid fiber coax (HFC) networks. Consequently, cable operators are increasingly turning to digital technology for the return path of their HFC or fiber-deep networks.

Advantages of Digital CATV Downstream Path

Currently, very expensive 1550 nm externally modulated (ExMod) lasers are employed to transport downstream analog channels in CATV systems. The use of the 1550 nm wavelength band is so that C-Band EDFAs can be utilized to support analog channel transport over 100 km and longer fiber link distances encountered in broadband HFC networks with consolidated headends. The use of expensive externally modulated lasers is necessitated by the requirement of ultra-low laser chirp in order to avoid dispersion-induced second-order distortion of the analog channels.

Digital downstream links would be advantageous, from performance, reach, and capacity perspectives, over current analog links. However, the large BC bandwidth of anywhere from 50 MHz to 1000 MHz has made it cost prohibitive in the past to use A/D converters to convert the entire forward (downstream) band into a multi-Gb/s digital signal and to transport the resultant data rate in a cost-sensitive access part of the network from headends/hubs to optical nodes.

The current trend towards reduced bandwidths for the analog channel band and larger bandwidths for the narrowcast (NC) band with QAM channels makes the use of digital A/D technology feasible for digitizing the analog downstream path of CAN systems. When analog BC bandwidths are reduced below 300 MHz digital downstream links become superior, from both cost and performance perspectives, over analog links. The parallel trend of falling cost for A/D converters and high data rate transport modules and components also made it feasible to apply the digitization approach to wider bandwidths than 300 MHz.

2. Discussion of the Related Art

Description of Conventional Digital Return CATV Systems

A digital return path includes a digital transmitter (DT), located at a cable "node", that digitizes the analog cable return path signal (analog signals here is applied to RF carriers frequency division multiplexed into return bandwidths, the carrier are either purely analog or QAM or other RF modulated digital signals); and a digital receiver (DR) that converts this signal back into an analog signal at the cable system hub or headend. A block diagram of a typical DT is shown in FIG. 1.

The cable return path RF signal is first low-pass filtered (LPF) to band-limit the signal and is then amplified (AMP). This signal is then digitized using an A/D converter at a sampling rate determined by a CLOCK signal whose frequency depends on the bandwidth of the cable return signal. This bandwidth differs in different parts of the world (for example, 45 MHz in North America and 65 MHz in Europe) and will also change in the future as MSOs start allocating more bandwidth to the return path. For example, some MSOs are thinking about return bandwidths in the 85 MHz to 200 MHz range.

The parallel data bit streams from the A/D output is then fed into a Processor/Mux unit. The Processor/Mux can be, for example, a microprocessor, a field-programmable gate array (FPGA), or other combination of software and chip-sets. The Processor/Mux unit performs such signal processing functions such as framing, dithering, formatting and encoding. It can also perform remote management and monitoring of the DT.

The Processor/Mux unit of the DT can also perform multiplexing of the digitized input RF signal with a second digital (optical) signal that arrives via the bi-directional optical connector of the DT. In this manner, one set of upstream data signals (e.g., from local small and medium businesses) could be multiplexed with another set of upstream data signals from a different location. Furthermore, several DTs can be optically cascaded in a bus network and the digital signal from the previous DT in this cascade can be multiplexed or combined digitally with the digitized RF signal from this location.

The multiplexed digital signal is then serialized using a serializer/de-serializer (SerDes) and this high-speed digital signal modulates an upstream laser transmitter. As previously mentioned, there is also a photodiode receiver that may be used for detecting an optical input signal that is multiplexed with the RF locally digitized input signal. FIG. 1 illustrates the case where the optical module is a small form-factor pluggable (SFP) component but any other type of bi-directional optical subassembly could be employed in practice.

It is possible to "segment" the node and double the return bandwidth per subscriber by digitizing two input RF signals and multiplexing both of them on the same digital return signal. This method of segmentation (by multiplexing two or more digitized return signals into one data stream) allows for using one wavelength per two or more segments thus preserving fiber capacity. FIG. 2 shows the block diagram of such a dual-channel digital transmitter.

There are now two analog RF input signals on two paths into the DT, two RF filters to band-limit the signals, and two A/D converters to digitize these signals. There is again a Processor/Mux unit that multiplexes these two digital streams (and a third data signal from the optical receiver) into a single digital signal. A SerDes serializes the parallel data bit stream output of the Processor/Mux and this high-speed digital signal modulates the upstream laser transmitter.

As before, there is also a photodiode receiver for detecting an optical input signal (carrying local data from SMBs or data from a previous DT in series with this DT or data from a network control unit) that is multiplexed with the two digitized RF input signals.

The digital return system may include a single DT or an optical cascade of DTs connected to a single-channel or dual-channel digital receiver (DR) over a length of fiber. Since the link is digital, the link length can vary from 0 km to >100 km with little degradation in link performance or output level at the DR output. A block diagram of a typical dual-channel DR is shown in FIG. 3.

The optical input to the DR is detected by a photodiode (or APD) receiver. This serial data stream is de-serialized using a SerDes and fed to a Processor/Demux unit that separates out the two embedded digital return signals from the Management/Monitoring and data signals. The two digital return signals are fed to D/A converters whose sampling rates depend on the bandwidth of the return signals.

The two analog signals are amplified (AMP) and low-pass filtered (LPF) by filters with cutoff frequencies equal to the bandwidth occupied by the return signals. The output levels of the two analog signals are set using Variable Attenuators (Var. Att.) and management software. The output level and signal-to-noise (SNR) ratio of the analog signals do not vary significantly with the fiber span length, an important advantage over analog return systems where both the SNR and output levels of the analog signals degrade rapidly as the fiber span length is increased.

The DTs and DRs described above can be used for forward bandwidth digitization and transport as described above. Hence, the signal digitization and transport in all aspects described above can be used for reverse and forward signal transportation with all the advantages pertinent to the baseband digital signal transmission.

SUMMARY OF THE INVENTION

There is a need for the following embodiments of the invention. Of course, the invention is not limited to these embodiments.

According to an embodiment of the invention, an apparatus comprises: a digital transmitter including a generic adaptable reconfigurable digital transmitter module; and a reversibly removable module operationally coupled to the generic adaptable reconfigurable digital transmitter module, wherein the reversibly removable module includes an RF filter with a cutoff frequency and a memory that stores parameters that define, at least in part, a specific adapted configuration. According to another embodiment of the invention, a method, comprises configuring a digital transmitter including coupling a reversibly removable module to a generic adaptable reconfigurable digital transmitter module, wherein the reversibly removable module includes an RF filter with a cutoff frequency and a memory that stores parameters that define, at least in part, a specific adapted configuration; reading a signal bandwidth from the memory of the reversibly removable module; and selecting an analog to digital sampling rate of the generic adaptable reconfigurable digital transmitter module as a function of the signal bandwidth.

According to another embodiment of the invention, an apparatus comprises: a digital receiver including a generic adaptable reconfigurable digital receiver module; and a reversibly removable module operationally coupled to the generic adaptable reconfigurable digital receiver module, wherein the reversibly removable module includes an RF filter with a cutoff frequency and a memory that stores parameters that define, at least in part, a specific adapted configuration. According to another embodiment of the invention, a method comprises configuring a digital receiver including coupling a reversibly removable module to a generic adaptable reconfigurable digital receiver module, wherein the reversibly removable module includes an RF filter with a cutoff frequency and a memory that stores parameters that define, at least in part, a specific adapted configuration; reading a signal bandwidth from the memory of the reversibly removable module; and selecting a digital to analog sampling rate of the generic adaptable reconfigurable digital receiver module as a function of the signal bandwidth.

According to another embodiment of the invention, an apparatus comprises a generic adaptable reconfigurable digital transmitter module having a programmable signal conditioner, wherein the programmable signal conditioner includes an analog to digital convertor programmed with an analog to digital sampling rate to define, at least in part, a specific adapted configuration. According to another embodiment of the invention, a method comprises configuring a generic adaptable reconfigurable digital transmitter having a programmable signal conditioner including specifying a number of input RF channels; specifying an RF bandwidth of an input channel; and selecting an analog to digital sampling rate of an analog to digital convertor of the programmable signal conditioner as a function of the RF bandwidth of the input channel using a processor/mux of the generic adaptable reconfigurable digital transmitter.

According to another embodiment of the invention, an apparatus comprises a generic adaptable reconfigurable digital receiver module having a programmable signal conditioner, wherein the programmable signal conditioner includes a digital to analog convertor programmed with a digital to analog sampling rate to define, at least in part, a specific adapted configuration. According to another embodiment of the invention, a method, comprises configuring a generic adaptable reconfigurable digital receiver having a programmable signal conditioner including specifying a number of output RF channels; specifying an RF bandwidth of an output channel; and selecting a digital to analog sampling rate of a digital to analog convertor of the programmable signal conditioner as a function of the RF bandwidth of the output channel using a processor/demux of the generic adaptable reconfigurable digital receiver.

These, and other, embodiments of the invention will be better appreciated and understood when considered in conjunction with the following description and the accompanying drawings. It should be understood, however, that the following description, while indicating various embodiments of the invention and numerous specific details thereof, is given for the purpose of illustration and does not imply limitation. Many substitutions, modifications, additions and/or rearrangements may be made within the scope of embodiments of the invention, and embodiments of the invention include all such substitutions, modifications, additions and/or rearrangements.

BRIEF DESCRIPTION OF THE DRAWINGS

The drawings accompanying and forming part of this specification are included to depict certain embodiments of the invention. A clearer concept of embodiments of the invention, and of components combinable with embodiments of the invention, and operation of systems provided with embodiments of the invention, will be readily apparent by referring to the exemplary, and therefore nonlimiting, embodiments illustrated in the drawings (wherein identical reference numerals (if they occur in more than one view) designate the same elements). Embodiments of the invention may be better understood by reference to one or more of these drawings in combination with the following description presented herein. It should be noted that the features illustrated in the drawings are not necessarily drawn to scale.

DESCRIPTION OF PREFERRED EMBODIMENTS

Embodiments of the invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the scope of the underlying inventive concept will become apparent to those skilled in the art from this disclosure.

The below-referenced U.S. Patent(s) and/or U.S. Patent Application(s) disclose embodiments that are useful for the purposes for which they are intended. The entire contents of U.S. Pat. Nos. 7,706,689; 6,452,708; and 6,760,550 are hereby expressly incorporated by reference herein for all purposes.

The digital transmitter technology described above results in a large number of different types of DTs and DRs that have to be provided for different bandwidths in order to maintain optimized cost per system to provide adequate bandwidth for the particular application. To provide cost-effective solution for each application, different modules for different bandwidths need to be built and supplied to operators. This results in additional cost of inventory on the manufacturing side and the need to replace DTs and DRs on the operator side when bandwidth requirements change. An alternative to it would be to build one module for the highest bandwidth needed at higher cost to the broadband system operator. Cable return systems in different parts of the world use different return bandwidths (e.g., 45 MHz in North America, 65 MHz in Europe). Furthermore, systems with higher return-path bandwidths are now being designed, ranging from 85 MHz up to 200 MHz or more. There can also be single-channel, dual-channel or higher number of channels in digital transmitters. The result can be a high number of different modules and DT/DR links that need to be built, stocked and replace by operators when the time to change bandwidth or to segment nodes without adding fiber arises. For example, a choice of six return bandwidths and two choices for number of channels per DT/DR digital link leads to a total of twelve DT models that have to be available. Additionally, the same number of DR models would also be required.

Figure 1:
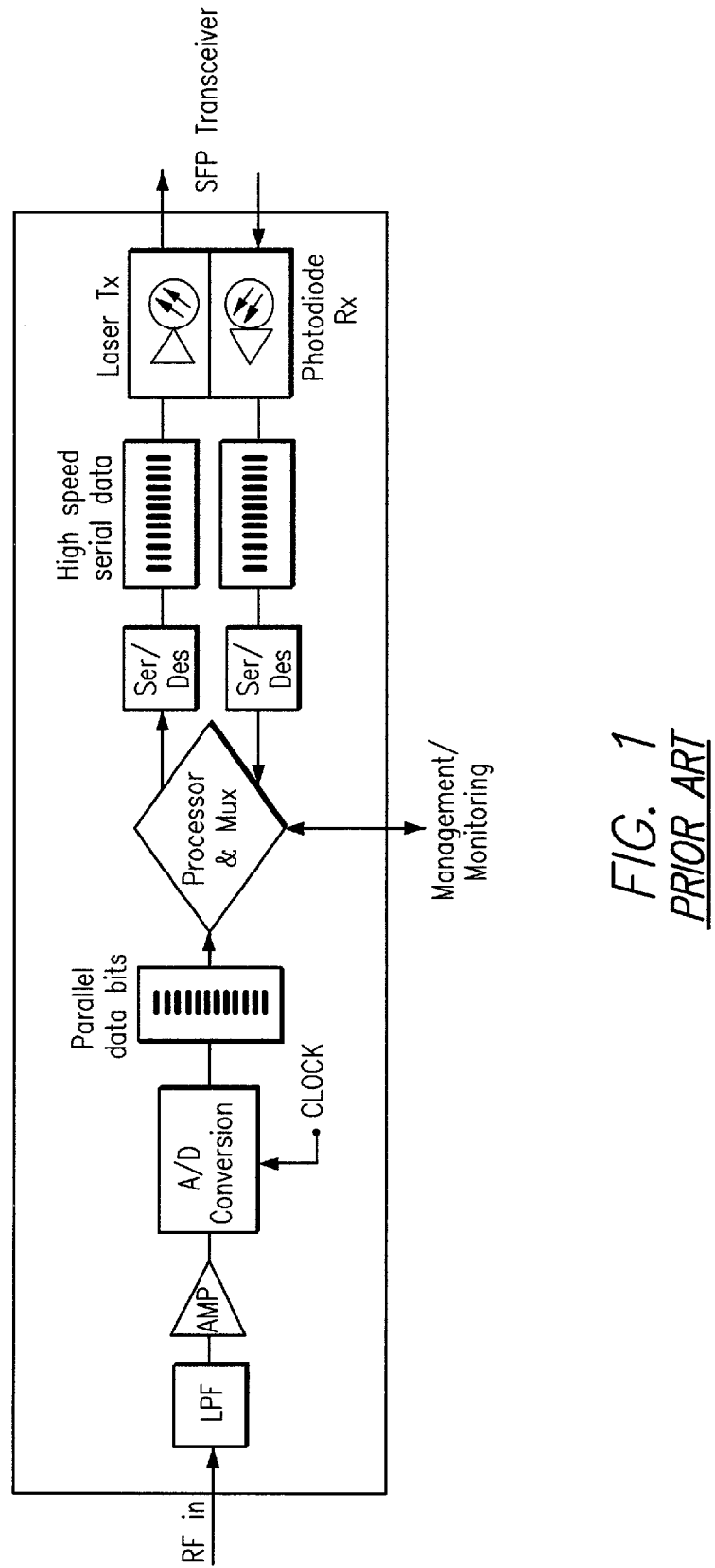
FIG. 1 illustrates a block diagram of a single-channel digital return path transmitter, appropriately labeled "PRIOR ART."
Figure 4:
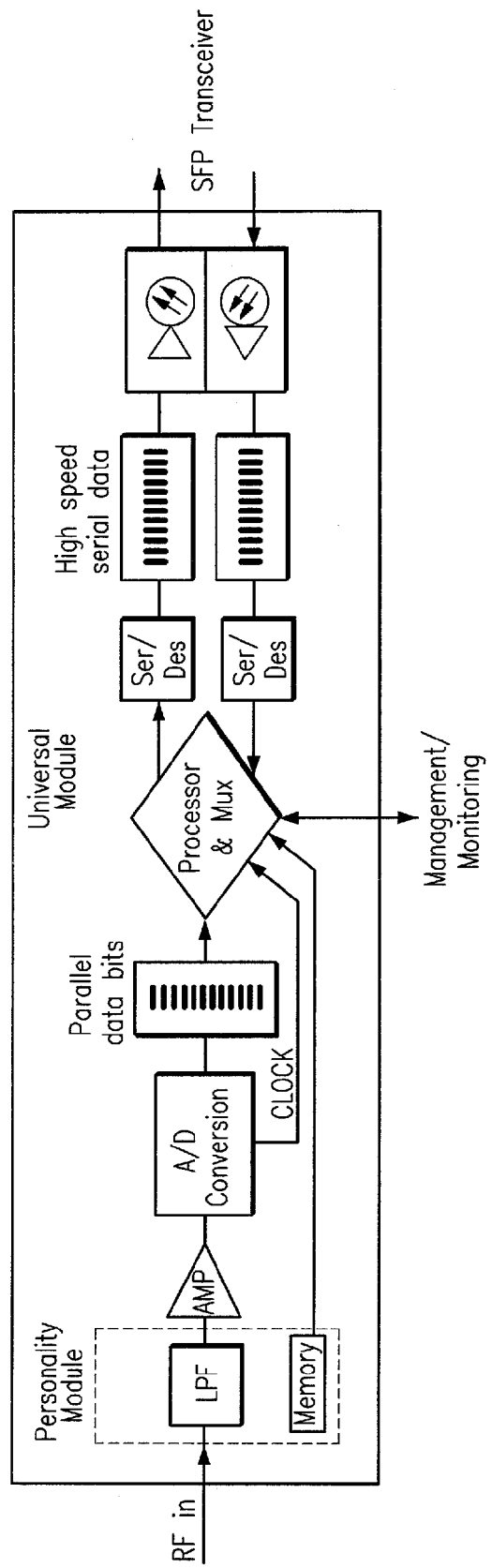
FIG. 4 illustrates a block diagram of a single-channel digital return path transmitter incorporating a universal module and a personality module, representing an embodiment of the invention.

A solution to providing a large number of bandwidth choices without having to stock a large number of DT models is shown in FIG. 4. FIG. 4 shows the block diagram of a single-channel upstream digital transmitter whose operation is as described for the DT shown in FIG. 1. The difference is that this DT is comprised a universal DT module and a personality module.

The personality module is a plug-in that contains an RF filter with cutoff frequency (45 MHz, 65 MHz, 85 MHz, etc. . . . ) appropriate to the desired analog return or forward bandwidth. It also contains memory (e.g., flash memory) where parameters describing the personality module are stored. The universal module comprises the rest of the digital transmitter. There is only one universal DT module, designed so that it will work with many flavors of personality modules.

The RF bandwidth of the amplifiers and other components in the universal module is large enough so that it can be used with all personality modules. A variety of clock frequencies are available in the universal module so that A/D conversion can be performed for all signal bandwidths specified by the personality modules.

"The use of a single universal module that supports the most common range of bandwidths and number of channels, using the most cost-effective optics, results in lower cost than frequently replacing the DT/DR modules as higher speed is required or by engineering for the highest anticipated bandwidth and number of channels from the start. Engineering for the highest anticipated bandwidth would require the highest speed optics and would be cost-burdensome for any particular application during the life-span of the technology and the system".

The Processor/Mux on the universal DT module reads the parameters of the personality module stored in its memory and selects the A/D sampling rate that is appropriate for the specified signal bandwidth. The result is lower inventory costs since there is only one model of DT that is designed to work with many personality modules. More importantly, if and when operators decides to change the required bandwidth of transmitted signals, they can upgrade the DT module by replacing the personality module thus saving significant cost of replacing the entire module with a new module.

Figure 2:
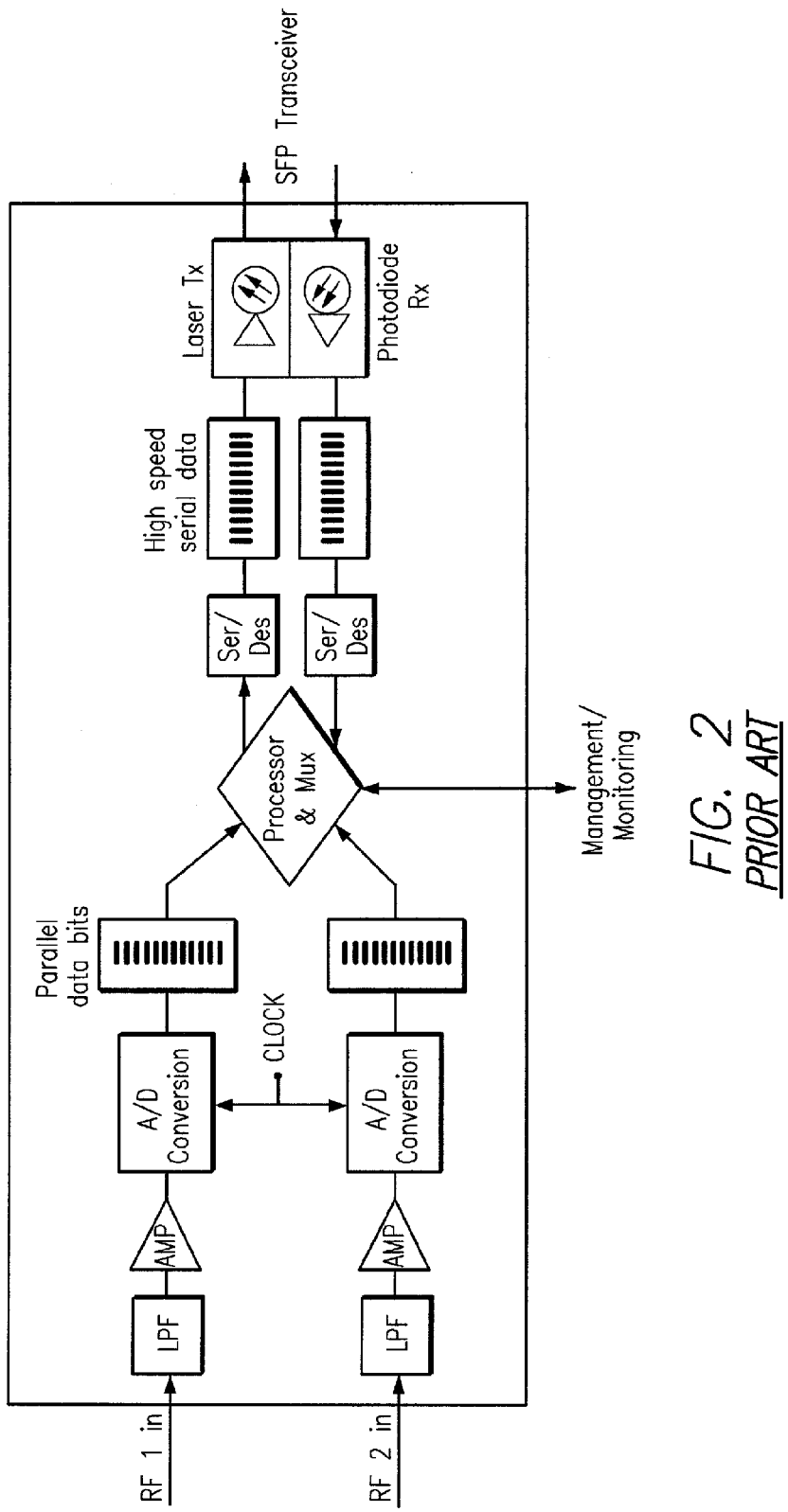
FIG. 2 illustrates a block diagram of a dual-channel digital return path transmitter, appropriately labeled "PRIOR ART."
Figure 5:
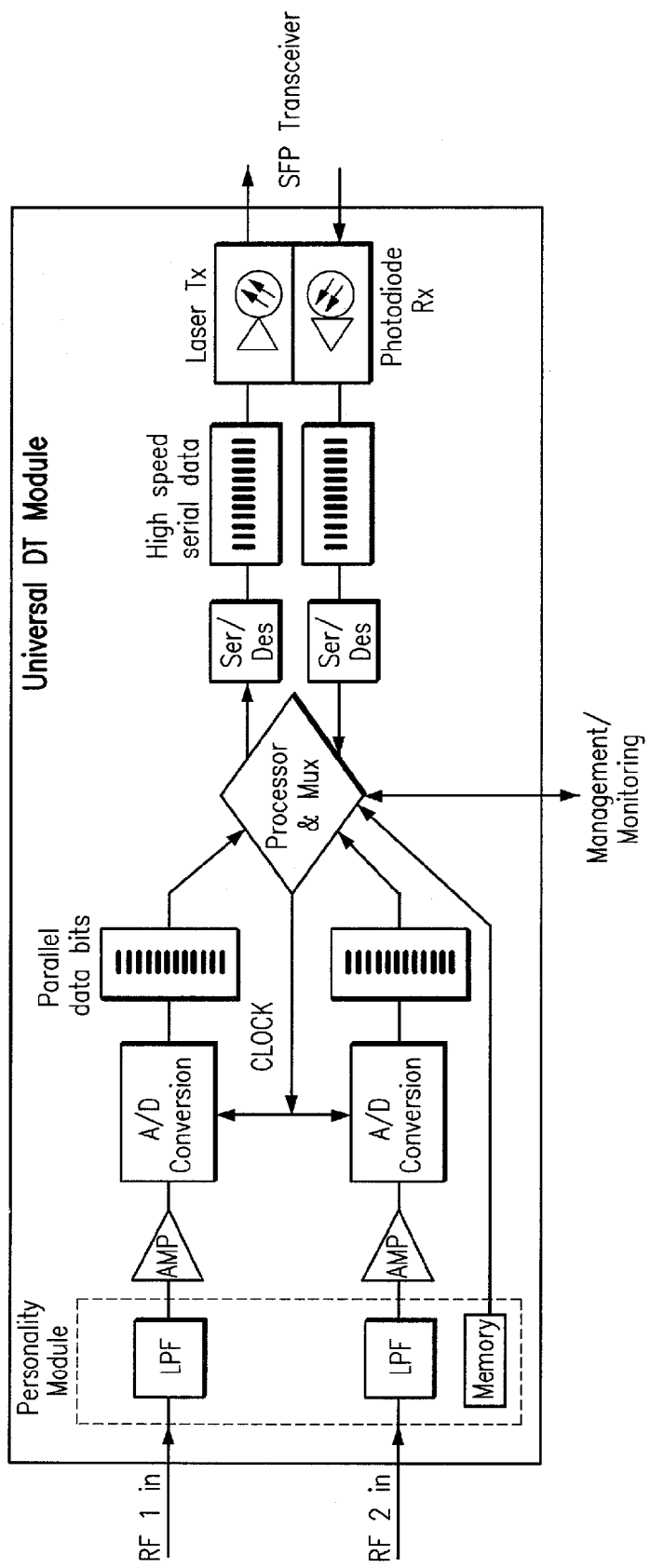
FIG. 5 illustrates a block diagram of a dual-channel digital return path transmitter incorporating a universal module and a personality module, representing an embodiment of the invention.

This approach applies also to segmentation and to changes in cascade configurations where the personality module can configure a single channel module into a dual (or higher order) channel module for ease of segmentation. FIG. 5 shows the block diagram of a dual-channel upstream digital transmitter comprised a universal module and a personality module. The operation of the DT is the same as for the DT shown in FIG. 2—the difference being that this DT is comprised a personality module and a universal DT module. The personality module now includes two RF filters for the two analog return path inputs. There is again memory on the personality module that stores relevant parameters of the personality module. The universal module can now be configured as a single-channel or dual-channel module for any bandwidth selected by an operator.

As in the single-channel case, the Processor/Mux unit on the DT reads the parameters of the personality module stored in its memory and picks the A/D sampling rate that is appropriate for the specified signal bandwidth. Although only single-channel and dual-channel DTs have been described, this is for illustrative purposes only, and is not meant as a limitation of the invention. An arbitrary number of RF channels may be supported by a DT.

Figure 6:
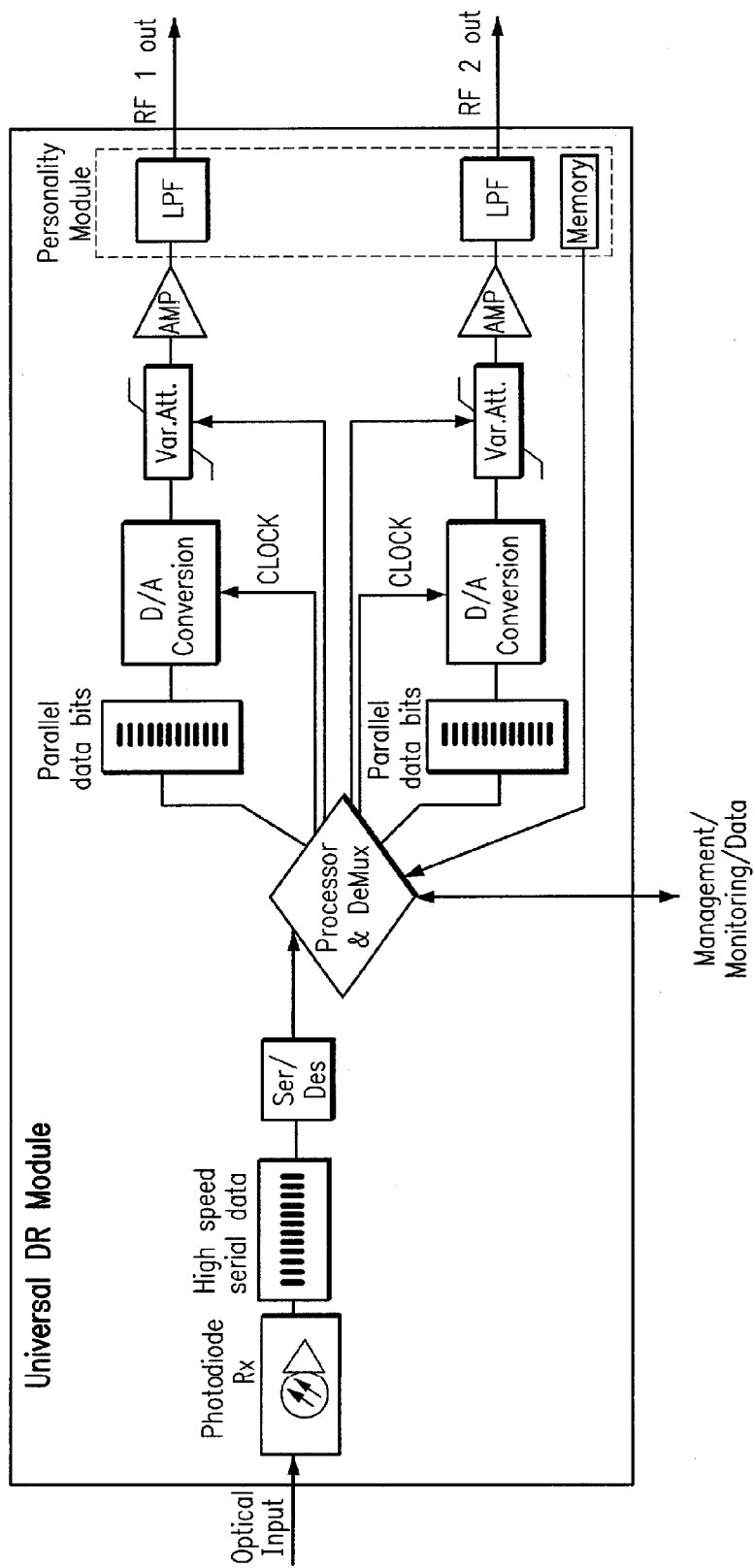
FIG. 6 illustrates a block diagram of a dual-channel digital return path receiver incorporating a universal module and a personality module, representing an embodiment of the invention.

FIG. 6 shows the block diagram of a dual-channel upstream digital receiver comprised a universal module and a personality module. Although the description is for a dual-channel DR, this is for illustrative purposes only and not a limitation of the invention. An arbitrary number of channels may be supported by a DR.

Figure 3:
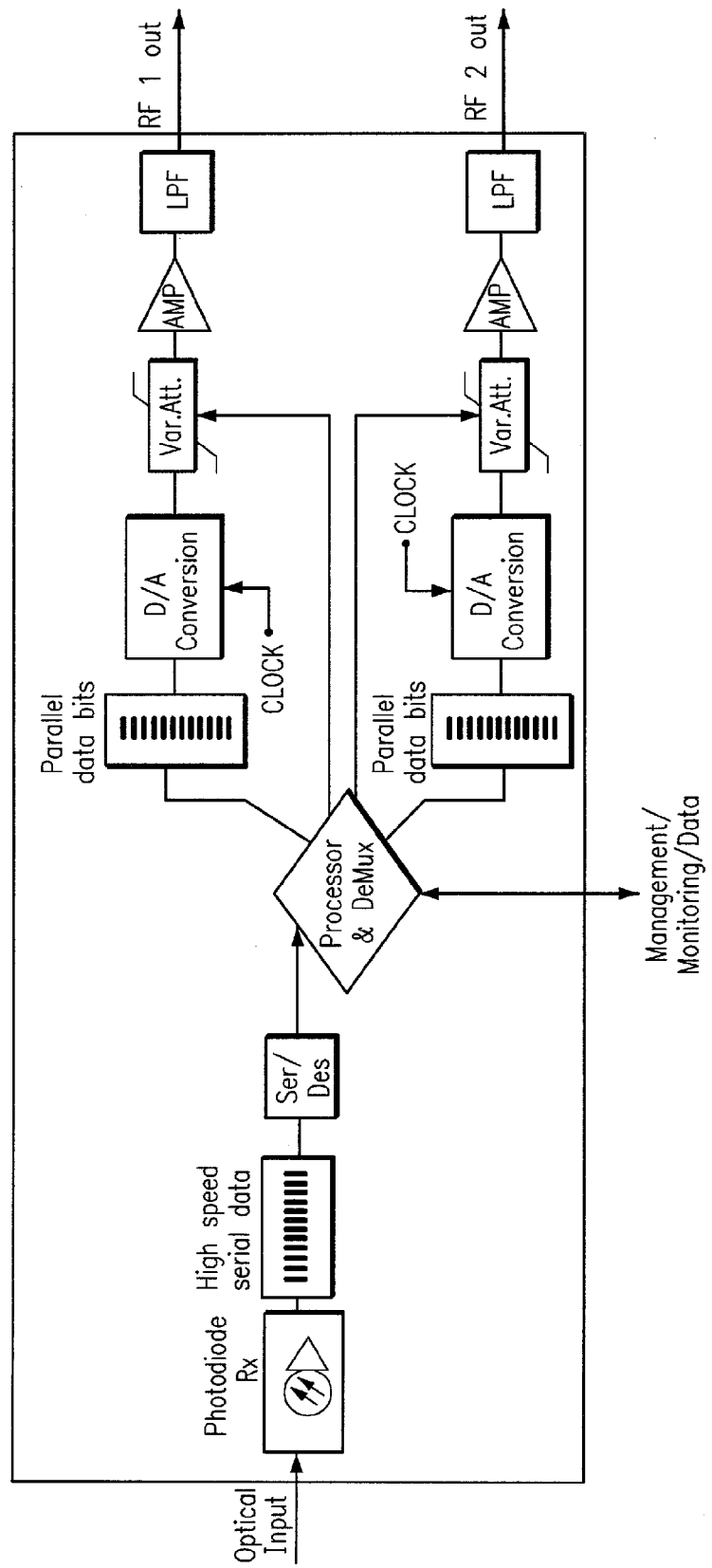
FIG. 3 illustrates a block diagram of a dual-channel digital return path receiver, appropriately labeled "PRIOR ART."

The operation of the DR is the same as for the DR shown in FIG. 3—the difference being that this DR is comprised a low-cost personality module and a universal DR module. The personality module includes two RF filters for the two analog return path outputs. There is again memory on the personality module that stores relevant parameters of the personality module. The Processor/Mux unit on the DR reads the parameters of the personality module stored in its memory and picks the D/A configuration that is appropriate for the specified signal bandwidth.

Universal Digital Transmitter/Receiver Modules for Downstream CATV

Figure 7:
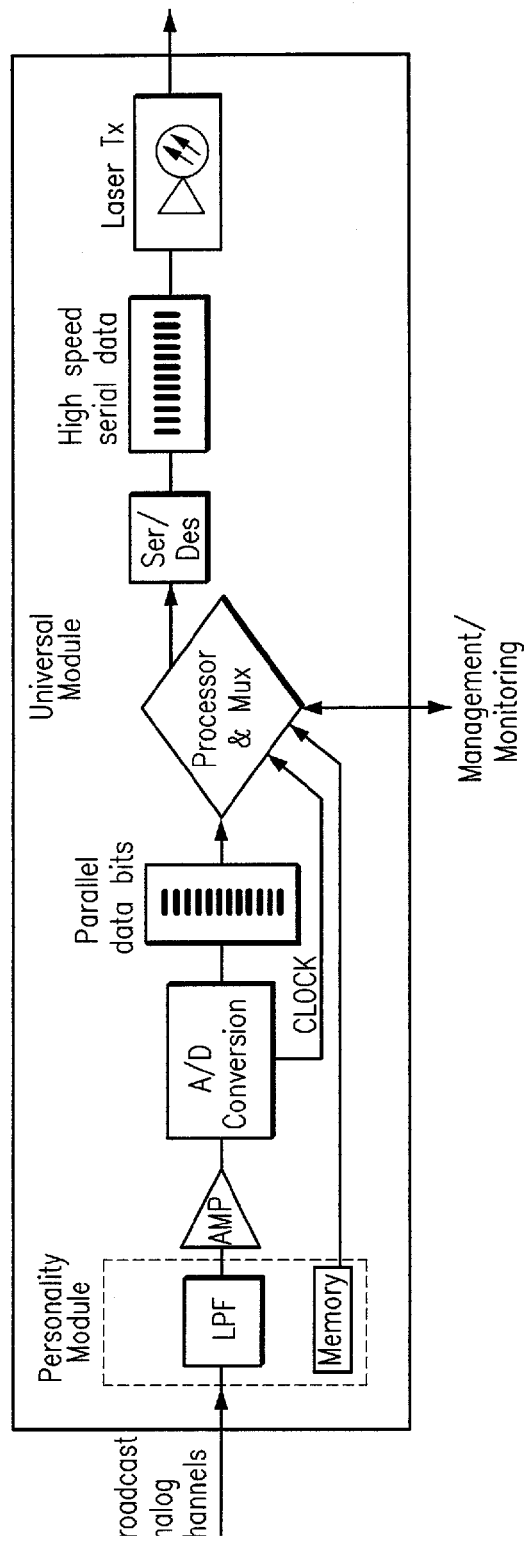
FIG. 7 illustrates a block diagram of a downstream digital transmitter (DS/DT) that digitizes the analog signals, representing an embodiment of the invention.

The current trend towards reduced analog BC bandwidth means that it may be cost effective to use digital A/D technology to digitize the entire analog downstream of CATV systems and transport it digitally to the node. FIG. 7 shows the block diagram of a downstream digital transmitter (DS/DT) that digitizes the analog signals. As described above, this is basically the same module as presented in FIG. 4.

The analog signal may include only about 30 analog carriers in the future, so that the analog bandwidth is about 258 MHz. This is for illustrative purposes only, and is not meant as a limitation of the invention. The LPF in the personality module would therefore have a cutoff frequency of 258 MHz in this example. The Processor/Mux unit on the DS/DT would read this bandwidth from the personality module's memory and set the sampling rate of the A/D converter to an appropriate frequency.

Figure 8:
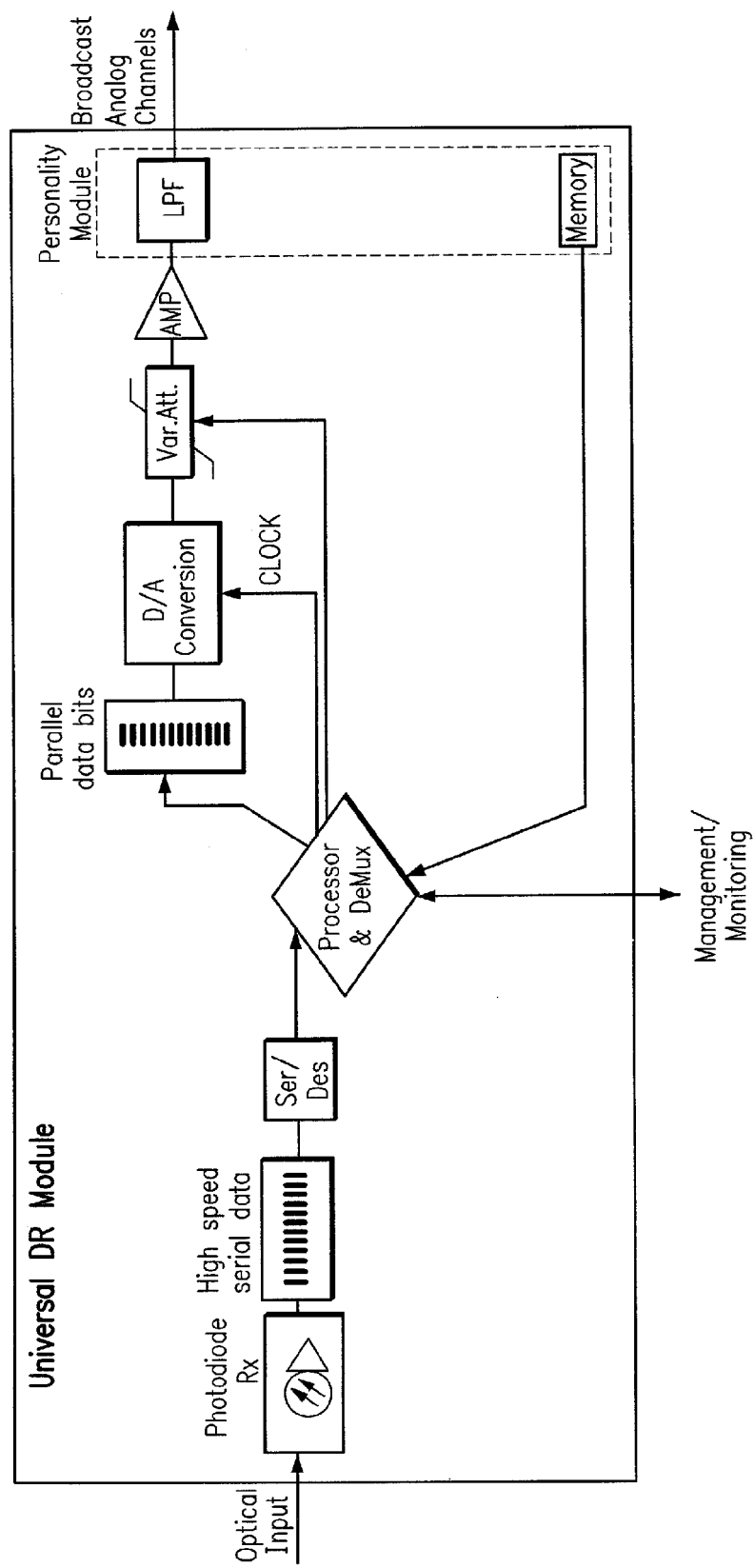
FIG. 8 illustrates a block diagram of a downstream digital receiver (DS/DR) for recovering the analog signals, representing an embodiment of the invention.

The downstream digital receiver (DS/DR), which is basically the same as single-channel upstream receiver, at the node would recover the analog channels as shown in FIG. 8. The LPF in the personality module would again have a cutoff frequency of 258 MHz in this example. The Processor/Mux unit on the DS/DT would read this bandwidth from the personality module's memory and set the sampling rate of the D/A converter to an appropriate frequency.

Baseband digital transmission of the analog channels would provide superior performance and potentially lower cost compared to the alternatives of analog transmission over an ExMod transmitter or a C-Band full-spectrum (i.e., 1 GHz) transmitter. The downstream set of DS/DR and DS/DT can also be designed in a dual-channel configuration thus allowing for ease of node segmentation for analog signals. Moreover, although the DS/DT and DS/DR were described herein as supporting analog signals, any signal can be part of the digitized bandwidth, including QAM signals.

Figure 9:
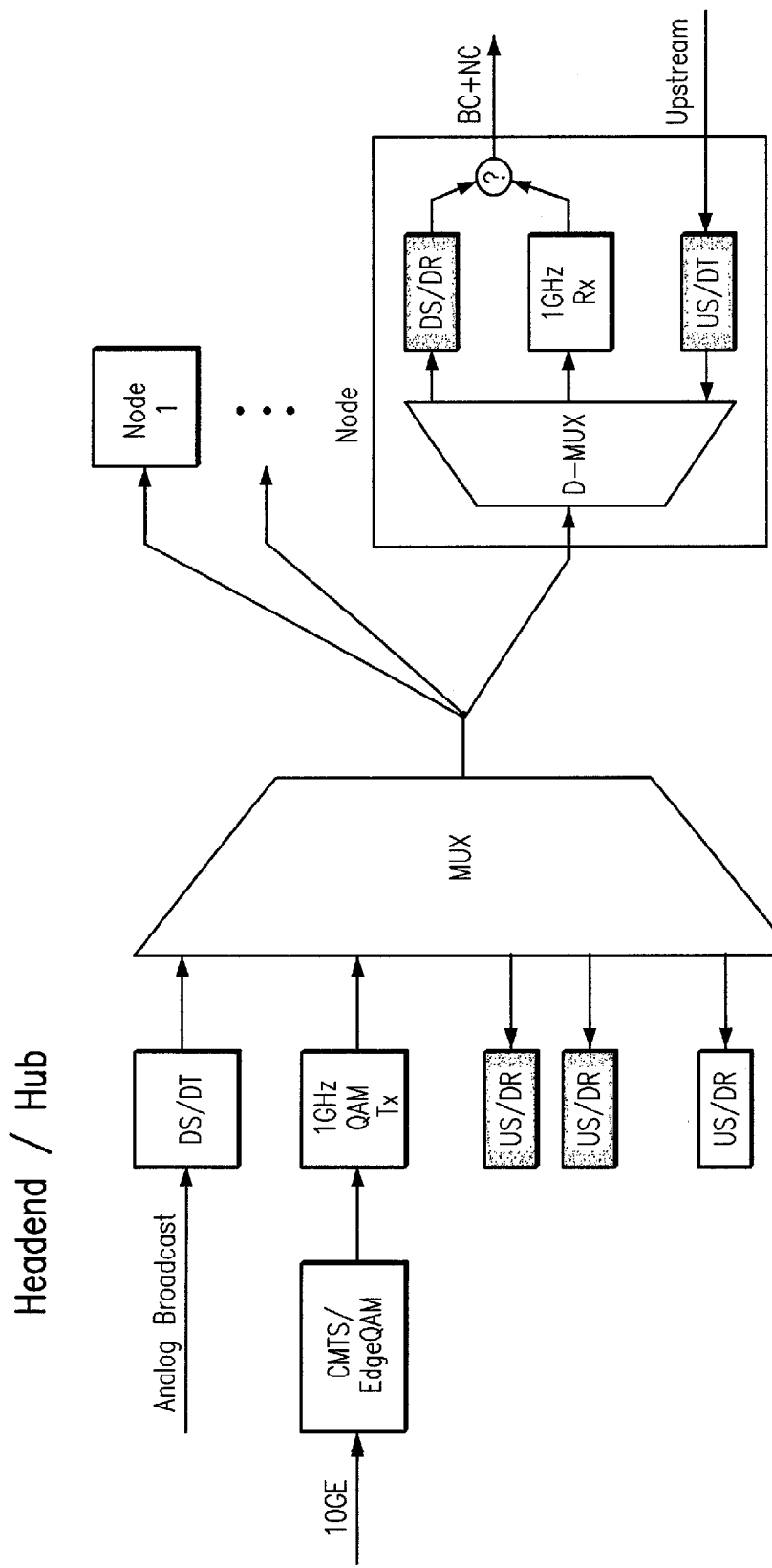
FIG. 9 illustrates a CATV system with digital upstream and downstream, with CMTS(s) and Edge-QAM(s) located at the headend/hub, representing an embodiment of the invention.

A combination of US/DT and US/DR for the upstream and DS/DT and DS/DR for the downstream would result in a completely digital CATV system in both the upstream and downstream directions as shown in FIG. 9. Here, the downstream (analog or digital QAM) channels are digitized and transported via the downstream DT (at the headend/hub) and DR (at the node) over one wavelength of a DWDM system.

The CMTS/Edge-QAM (an example of the signal source) is located in the headend/hub in this example, and the NC QAM channels are transported over a C-Band QAM transmitter using a second wavelength. Not shown are additional wavelengths that could be used to transport more downstream NC channel sets. The upstream signals are transported via upstream DTs (at the nodes) and DRs (at the headend/hub).

Figure 10:
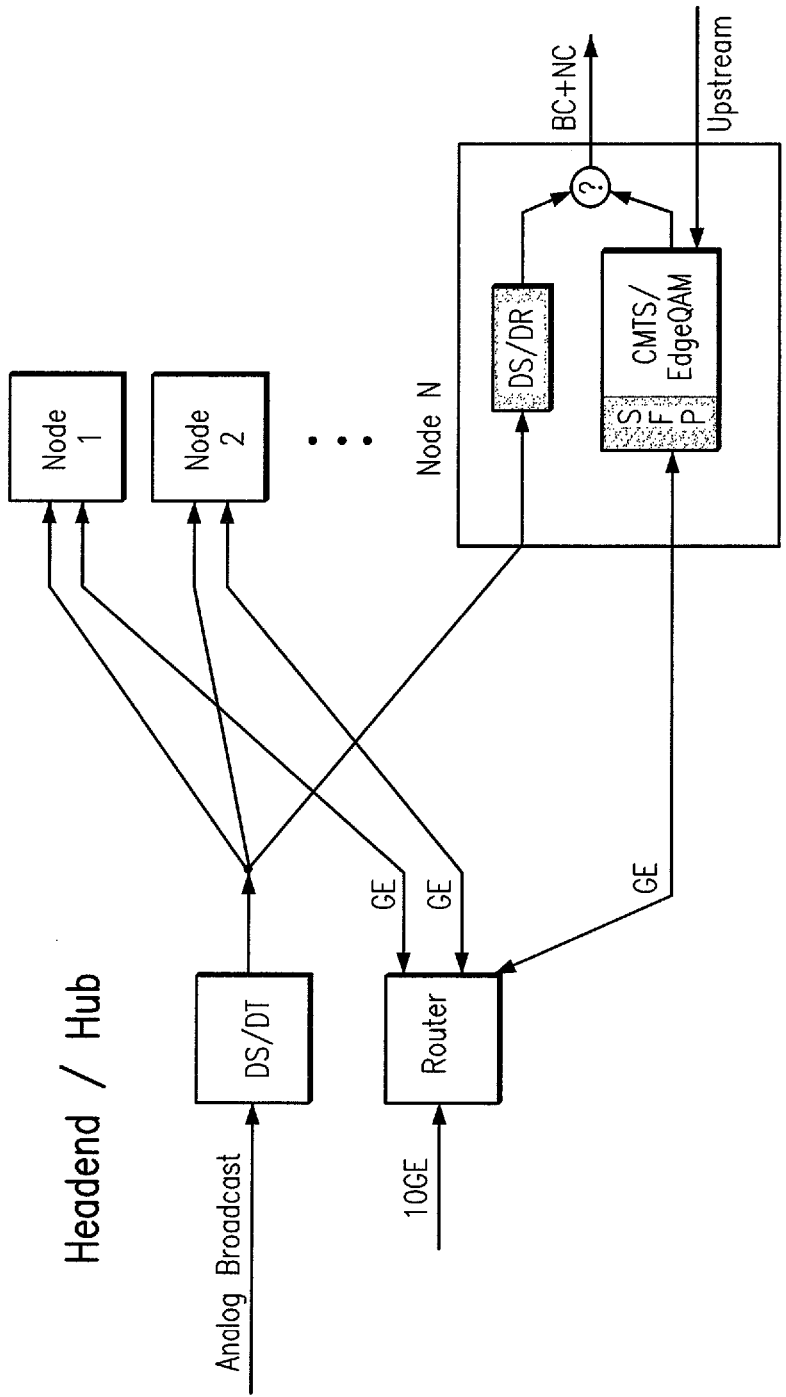
FIG. 10 illustrates a CATV system with digital upstream and downstream, with CMTS(s) and Edge-QAM(s) located at the cable nodes, representing an embodiment of the invention.

Another architecture, with the CMTS and Edge-QAM located at the nodes, is shown in FIG. 10. The downstream (analog or digital QAM) channels that originate in the headend are again digitized and transported via the downstream DT (at the headend/hub) and DR (at the node) over one fiber. A second fiber (or a separate set of wavelengths on the same fiber) to each node would carry a bi-directional Ethernet signal (from a router to the CMTS/Edge-QAM (using bi-directional SFPs or XFPs or other bidirectional optical transmission means). Such an all-digital cable system would provide many operational advantages, such as increased fiber distances and greater DWDM densities.

Programmable Digital Transmitter for Upstream/Downstream CATV

In another embodiment of the invention, the personality modules in the digital transmitters (in FIGS. 4, 5 and 7) are replaced by Programmable Signal Conditioners (PSC). The PSCs perform the tasks of A/D conversion, amplification, and (optional) digital filtering. Unlike personality modules, which are plug-in devices, the PSC is non-removable and is configured through software, either locally or remotely.

Figure 11:
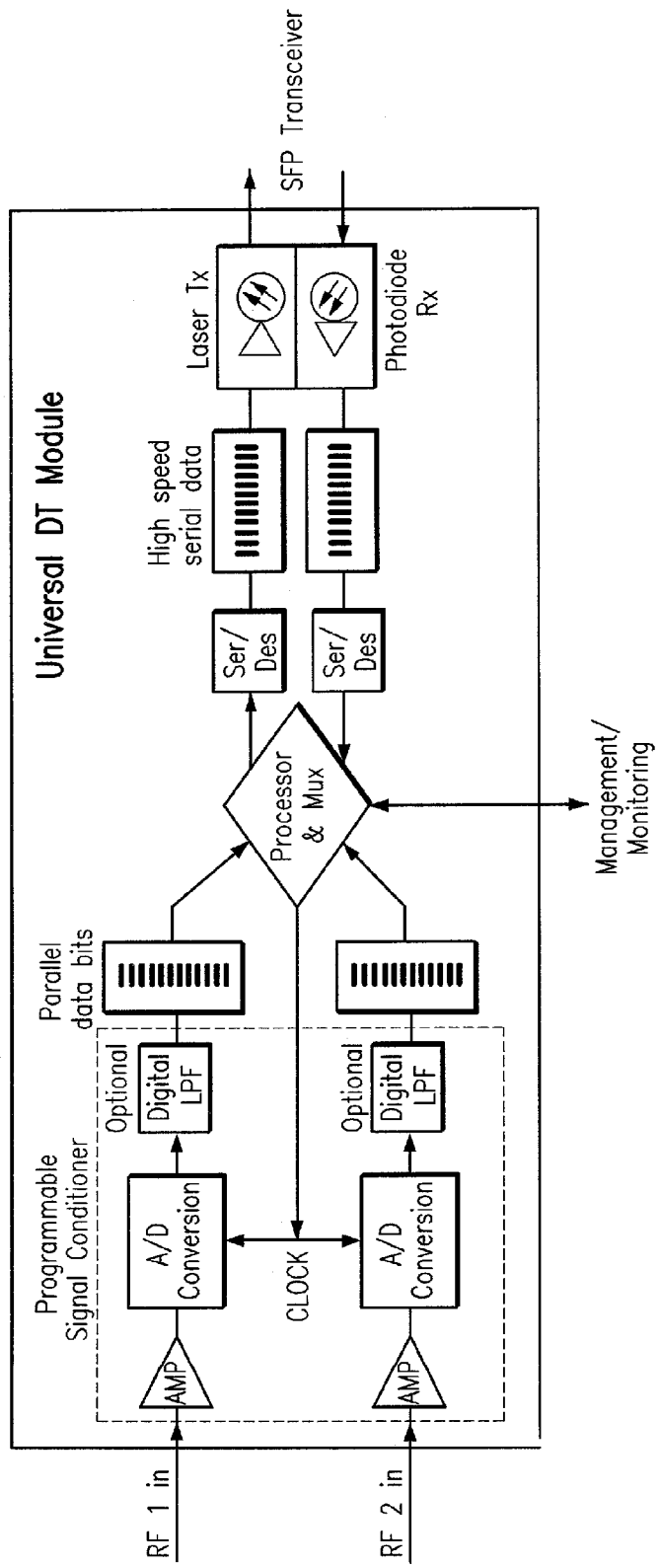
FIG. 11 illustrates a block diagram of a dual-channel digital return path transmitter incorporating a programmable signal conditioner, representing an embodiment of the invention.

A block diagram of a dual-channel programmable digital transmitter incorporating a PSC is shown in FIG. 11. Although the description is for a dual-channel DT, this is for illustrative purposes only and not a limitation of the invention. An arbitrary number of channels may be supported by a programmable DT. Furthermore, these channels may be either upstream or downstream CAN signals.

In this embodiment of the invention, there is only a single universal DT, and even the requirement to stock multiple personality plug-ins is eliminated. The configuration of the PSC is done through software, either locally or remotely. The configuration can include specifying the number of input RF channels (1, 2, 3, etc), the RF bandwidths of the input channels (45 MHz, 65 MHz, 85 MHz, 200 MHz, etc) and other system parameters. The Processor/Mux on the universal DT then selects the A/D sampling rate that is appropriate for the specified signal bandwidth (s). A variety of clock frequencies are available in the universal module so that A/D conversion can be performed for all signal bandwidths specified.

The result is lower inventory costs since there is a single universal DT that can be configured to work at many RF bandwidths and with different number of RF channels. Another important advantage is that a cable operator, if and when they decide to segment a node or change the required bandwidth of transmitted signals, can re-configure the DT module remotely, thus resulting in significant savings in capital and labor costs.

The functions of the PSC can be done either separately, using digital-to-analog converter (DAC) and digital signal processing (DSP) chipsets, as shown in FIG. 11, or some of the functions of the PSC could be incorporated into the processor/FPGA. For example, the processor/FPGA could perform digital low-pass filtering in addition to other signal processing functions such as framing, dithering, formatting and encoding as well as performing remote management and monitoring of the DT. The DT could also insert overhead bits containing system information into the output serial data streams so that the DR at the other end could extract this information and configure itself automatically.

Programmable Digital Receiver for Upstream/Downstream CATV

In another embodiment of the invention, the personality modules in the digital receivers (in FIGS. 6 and 8) are replaced by Programmable Signal Conditioners (PSC). The PSCs perform the tasks of D/A conversion, amplification, and (optional) digital filtering. Unlike personality modules, which are plug-in devices, the PSC is non-removable and is configured through software, either locally, remotely, or automatically. Automatic configuration of the DR could be performed if the DT at the other end had inserted system information into the serial data streams.

Figure 12:
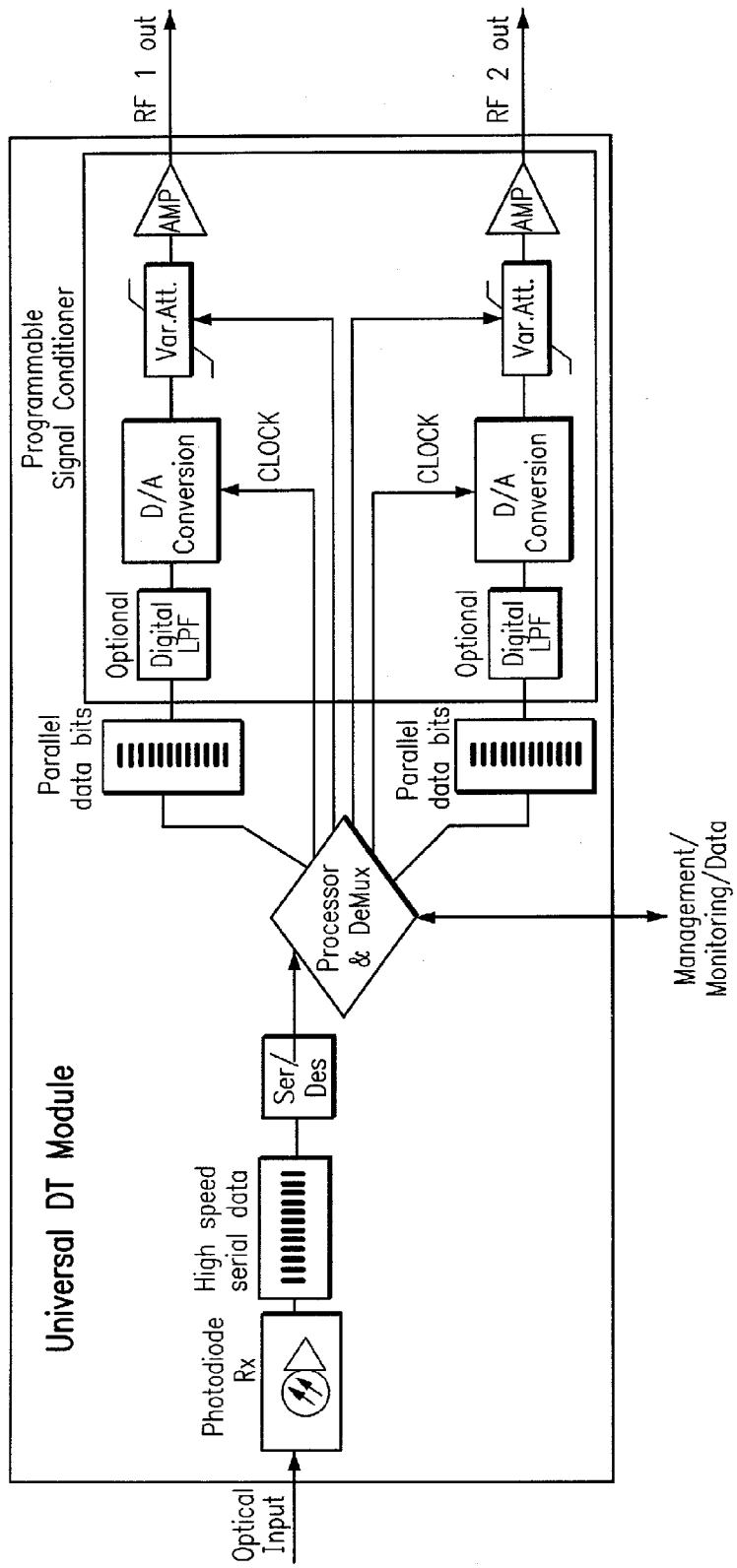
FIG. 12 illustrates a block diagram of a dual-channel digital return path receiver incorporating a programmable signal conditioner, representing an embodiment of the invention.

A block diagram of a dual-channel programmable digital receiver incorporating a PSC is shown in FIG. 12. Although the description is for a dual-channel DR, this is for illustrative purposes only and not a limitation of the invention. An arbitrary number of channels may be supported by a programmable DR. Furthermore, these channels may be either upstream or downstream CAN signals.

In this embodiment of the invention, there is only a single universal DR, and even the requirement to stock multiple personality plug-ins is eliminated. The configuration of the PSC is done through software, either locally, remotely or automatically. Local or remote configuration can include specifying the number of input RF channels (1, 2, 3, etc), the RF bandwidths of the input channels (45 MHz, 65 MHz, 85 MHz, 200 MHz, etc) and other system parameters. In automatic configuration, the DR would extract system information that had already been encoded in the serial data streams by the DT at the other end. The Processor/Mux on the universal DR would then select the D/A sampling rate that is appropriate for the specified signal bandwidth (s). A variety of clock frequencies are available in the universal module so that D/A conversion could be performed for all signal bandwidths specified.

The result is lower inventory costs since there is a single universal DR that can be configured to work at many RF bandwidths and with different number of RF channels. Another important advantage is that a cable operator, if and when they decide to segment a node or change the required bandwidth of transmitted signals, can re-configure both the DT and DR modules remotely, thus resulting in significant savings in capital and labor costs.

The functions of the PSC can be done either separately, using DAC and DSP chipsets, as shown in FIG. 12, or some of the functions of the PSC could be incorporated into the processor/FPGA. For example, digital filtering could be performed at the processor/FPGA if desired.

In conclusion, what is claimed are digital transmitters for digitizing upstream or downstream analog cable signals, and digital receivers that convert these digital signals back to the original analog signals that are comprised: a personality module plug-in that filters the signals to one of many possible bandwidths, and a universal module that can support a multitude of such personality modules. The universal module reads memory on the personality module and uses this information to select the appropriate clock frequency for the A/D converter (in the case of digital transmitters) and to select appropriate configuration of the D/A converter (in the case of digital receivers). The use of a multitude of personality module plug-ins that can be plugged into a single universal module greatly reduces the number of models of digital transmitters and receivers that have to be inventoried, reduces cost, and simplifies bandwidth upgrades (downstream and upstream) and segmentation for coaxial broadband network operators.

In another embodiment of the invention, there is only a universal DT or DR module with a programmable signal conditioner and no removable personality modules. The configuration of the PSC is done through software, either locally or remotely (or also automatically in the case of a DR). An important advantage of this embodiment is that a cable operator, if and when they decide to segment a node or change the required bandwidth of transmitted signals, can re-configure both the DT and DR modules remotely, thus resulting in significant savings in capital and labor costs.

EXAMPLES

Specific embodiments of the invention will now be further described by the following, nonlimiting examples which will serve to illustrate in some detail various features. The following examples are included to facilitate an understanding of ways in which an embodiment of the invention may be practiced. It should be appreciated that the examples which follow represent embodiments discovered to function well in the practice of the invention, and thus can be considered to constitute preferred models) for the practice of the embodiments of the invention. However, it should be appreciated that many changes can be made in the exemplary embodiments which are disclosed while still obtaining like or similar result without departing from the scope of embodiments of the invention. Accordingly, the examples should not be construed as limiting the scope of the invention.

Example 1

An exemplary embodiment of the invention includes a single-channel return (upstream)) digital transmitter (DT) as shown in FIG. 4 that digitizes analog cable return signals, the DT having: a personality module plug-in that low-pass filters the input analog signal to one of a multitude of possible bandwidths (45 MHz, 65 MHz, 85 MHz, 100 MHz, 150 MHz, 200 MHz, 258 MHz are some of the many possibilities); and a universal DT module that supports all personality module plug-ins, where memory on the personality module is read by the Processor/Mux unit on the universal module which then uses this information to select the A/D sampling rate and configuration that is appropriate for the specified signal bandwidth.

Example 2

An exemplary embodiment of the invention includes a return (upstream) path digital receiver (DR) similar to that shown in FIG. 6 that converts a digital signal into the original analog cable return (upstream) signal, the DR having: a personality module plug-in that low-pass filters the output analog signal to one of a multitude of possible bandwidths (45 MHz, 65 MHz, 85 MHz, 100 MHz, 150 MHz, 200 MHz, 258 MHz are some of the many possibilities); and a universal DR module that supports all personality module plug-ins, where memory on the personality module that is read by the Processor/Mux unit on the universal module which then uses this information to select the D/A configuration that is appropriate for the specified signal bandwidth.

Example 3

An exemplary embodiment of the invention includes a return (upstream) digital transmitter (DT) as shown in FIG. 5 that digitizes two or more analog cable return (upstream) signals, the DT having: a personality module plug-in that low-pass filters the multiple input analog signals to one of a multitude of possible bandwidths (45 MHz, 65 MHz, 85 MHz, 100 MHz, 150 MHz, 200 MHz, 258 MHz are some of the many possibilities); and a universal DT module that supports all personality modules plug-ins, where memory on the personality module that is read by the Processor/Mux unit on the universal module which then uses this information to select the A/D sampling rate and configuration that is appropriate for the specified signal bandwidth and number of channels (return path signals) supported on a single optical wavelength.

Example 4

An exemplary embodiment of the invention includes a return path digital receiver (DR) as shown in FIG. 6 converts a digital signal into the two or more original analog cable return signals, the DR having: a personality module plug-in that low-pass filters the output analog signals to one of a multitude of possible bandwidths (45 MHz, 65 MHz, 85 MHz, 100 MHz, 150 MHz, 200 MHz, 258 MHz are some of the many possibilities); and a universal DR module that supports all personality modules plug-ins, where memory on the personality module that is read by the Processor/Mux unit on the universal module which then uses this information to select the D/A configuration that is appropriate for the specified signal bandwidth and number of channels (return path signals) supported on a single optical wavelength.

Example 5

An exemplary embodiment of the invention includes a downstream digital transmitter (DT) that digitizes the analog signals as shown in FIG. 8, the DT having: a personality module plug-in that low-pass filters the input analog signals to one of a multitude of possible bandwidths (typically, but not limited to, between 200 MHz and 300 MHz); and a universal DT module that supports all personality modules plug-ins, where memory on the personality module that is read by the Processor/Mux unit on the universal module which then uses this information to select the ND sampling rate that is appropriate for the specified signal bandwidth and number of channels (forward path signals) supported on a single optical wavelength.

Example 6

An exemplary embodiment of the invention includes a downstream digital receiver (DR) that converts a digital signal back into the analog signals as shown in FIG. 9, the DR having: a personality module plug-in that low-pass filters the input analog signals to one of a multitude of possible bandwidths (typically, but not limited to, between 200 MHz and 300 MHz); and a universal DR module that supports all personality modules plug-ins, where memory on the personality module that is read by the Processor/Mux unit on the universal module which then uses this information to select the D/A configuration that is appropriate for the specified signal bandwidth and number of channels (forward path signals) supported on a single optical wavelength.

Example 7

An exemplary embodiment of the invention includes a digital transmitter (DT) as shown in FIG. 11 digitizes one or more RF signals (either CATV upstream or downstream signals), the DT having: a Programmable Signal Conditioners (PSC) that perform the tasks of A/D conversion, amplification, and (optional) digital filtering of multiple input analog signals to one of a multitude of possible bandwidths (45 MHz, 65 MHz, 85 MHz, 100 MHz, 150 MHz, 200 MHz, 258 MHz are some of the many possibilities); and a universal DT module that supports a variety of clock frequencies so that A/D conversion can be performed for all required signal bandwidths, where software configuration of the PSC (including the number of channels, signal bandwidths and other relevant system parameters) is configured either locally or remotely.

Example 8

An exemplary embodiment of the invention includes a digital receiver (DR) as shown in FIG. 12 converts a digital signal into the one or more RF signals (either CATV upstream or downstream signals), the DR having: a Programmable Signal Conditioners (PSC) that low-pass filters the output analog signals to one of a multitude of possible bandwidths (45 MHz, 65 MHz, 85 MHz, 100 MHz, 150 MHz, 200 MHz, 258 MHz are some of the many possibilities); and a universal DR module that supports a variety of clock frequencies so that D/A conversion can be performed for all required signal bandwidths, where software configuration of the PSC (including the number of channels, signal bandwidths and other relevant system parameters) is configured either locally, remotely or automatically (for the case where the DT at the other end had inserted system information into the serial data streams).

Example 9

An exemplary embodiment of the invention includes a system with the digital transmitters and digital receivers of the above-described examples 1-8, wherein both the downstream and upstream cable paths are digitized and transported over a DWDM system using different wavelengths, with narrowcast QAM channels transported over another set of distinct wavelength(s) using full-spectrum C-Band QAM transmitter(s), in a configuration where the CMTS and Edge-QAM are located at the cable headend/hub, as shown in FIG. 9.

Example 10

An exemplary embodiment of the invention includes a system with the digital transmitters and digital receivers of the above-described examples 1-8, wherein the downstream analog signal is digitized and transported to each node over one fiber, and a second separate set of wavelengths on the same or different fiber carries a bi-directional GE signal (with a capacity of twenty-four narrowcast 256-QAM channels in both directions) from a router in the headend/hub to a CMTS/Edge-QAM in the node (using bi-directional SFPs), as shown in FIG. 10.

DEFINITIONS

The term universal is intended to mean generic, adaptable and reconfigurable. The term personality is intended to mean defining, at least in part, a specific adapted configuration. The terms program and/or software and/or the phrases computer program and/or computer software are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system).

The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The term means, when followed by the term "for" is intended to mean hardware, firmware and/or software for achieving a result. The term step, when followed by the term "for" is intended to mean a (sub)method, (sub)process and/or (sub) routine for achieving the recited result. Unless otherwise defined, all technical and scientific terms used herein have the same meaning as commonly understood by one of ordinary skill in the art to which this invention belongs. In case of conflict, the present specification, including definitions, will control.

CONCLUSION

The described embodiments and examples are illustrative only and not intended to be limiting. Although embodiments of the invention can be implemented separately, embodiments of the invention may be integrated into the system(s) with which they are associated. All the embodiments of the invention disclosed herein can be made and used without undue experimentation in light of the disclosure. Although the best mode of the invention contemplated by the inventor(s) is disclosed, embodiments of the invention are not limited thereto. Embodiments of the invention are not limited by theoretical statements (if any) recited herein. The individual steps of embodiments of the invention need not be performed in the disclosed manner, or combined in the disclosed sequences, but may be performed in any and all manner and/or combined in any and all sequences. The individual components of embodiments of the invention need not be formed in the disclosed shapes, or combined in the disclosed configurations, but could be provided in any and all shapes, and/or combined in any and all configurations.

Various substitutions, modifications, additions and/or rearrangements of the features of embodiments of the invention may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. An apparatus, comprising: a digital transmitter including a generic adaptable reconfigurable digital transmitter module including an analog to digital convertor; and a reversibly removable module operationally coupled to the generic adaptable reconfigurable digital transmitter module, wherein the reversibly removable module includes an RF filter with a cutoff frequency and a programmable memory that stores parameters that define, at least in part, a specific adapted configuration for the generic adaptable reconfigurable digital transmitter module including an analog to digital sampling rate as a function of a signal bandwidth read from the programmable memory of the reversibly removable module.

2. The apparatus of claim 1, wherein the wherein the reversibly removable module includes another RF filter.

3. The apparatus of claim 1, further comprising CMTS(s) and Edge-QAM(s) co-located with the digital transmitter at a headend/hub.

4. A method, comprising configuring a digital transmitter including
coupling a reversibly removable module to a generic adaptable reconfigurable digital transmitter module including an analog to digital convertor, wherein the reversibly removable module includes an RF filter with a cutoff frequency and a programmable memory that stores parameters that define, at least in part, a specific adapted configuration for the generic adaptable reconfigurable digital transmitter module;
reading a signal bandwidth from the programmable memory of the reversibly removable module; and
selecting an analog to digital sampling rate of the analog to digital convertor of the generic adaptable reconfigurable digital transmitter module as a function of the signal bandwidth.

5. The method of claim 4, further comprising reading another signal bandwidth from the memory of the reversibly removable module; and
selecting another analog to digital sampling rate of the generic adaptable reconfigurable digital transmitter module as a function of the another signal bandwidth.

6. An apparatus, comprising: a digital receiver including a generic adaptable reconfigurable digital receiver module including a digital to analog convertor; and a reversibly removable module operationally coupled to the generic adaptable reconfigurable digital receiver module, wherein the reversibly removable module includes an RF filter with a cutoff frequency and a programmable memory that stores parameters that define, at least in part, a specific adapted configuration for the generic adaptable reconfigurable digital receiver module including a digital to analog sampling rate as a function of a signal bandwidth read from the programmable memory of the reversibly removable module.

7. The apparatus of claim 6, wherein the wherein the reversibly removable module includes another RF filter.

8. The apparatus of claim 6, further comprising CMTS(s) and Edge-QAM(s) co-located with the digital receiver at a node.

9. A method, comprising configuring a digital receiver including
coupling a reversibly removable module to a generic adaptable reconfigurable digital receiver module including a digital to analog convertor, wherein the reversibly removable module includes an RF filter with a cutoff frequency and a programmable memory that stores parameters that define, at least in part, a specific adapted configuration for the generic adaptable reconfigurable digital receiver module;
reading a signal bandwidth from the programmable memory of the reversibly removable module; and
selecting a digital to analog sampling rate of the digital to analog convertor of the generic adaptable reconfigurable digital receiver module as a function of the signal bandwidth.

10. The method of claim 9, further comprising reading another signal bandwidth from the memory of the reversibly removable module; and
selecting another digital to analog sampling rate of the generic adaptable reconfigurable digital receiver module as a function of the another signal bandwidth.

11. An apparatus, comprising a generic adaptable reconfigurable digital transmitter module having a programmable signal conditioner, wherein the programmable signal conditioner includes an analog to digital convertor programmed with an analog to digital sampling rate to define, at least in part, a specific adapted configuration for the generic adaptable reconfigurable digital transmitter module including the analog to digital sampling rate as a function of a signal bandwidth of the programmed analog to digital convertor.

12. The apparatus of claim 11, wherein the programmable signal conditioner includes another analog to digital convertor programmed to define, at least in part, the specific adapted configuration, the generic adaptable reconfigurable digital transmitter module including at least two channels.

13. The apparatus of claim 11, further comprising CMTS(s) and Edge-QAM(s) co-located with the generic adaptable reconfigurable digital transmitter module at a headend/hub.

14. A method, comprising configuring a generic adaptable reconfigurable digital transmitter having a programmable signal conditioner having an analog to digital convertor including
specifying a number of input RF channels to the generic adaptable reconfigurable digital transmitter;
specifying an RF signal bandwidth of an input channel; and
selecting an analog to digital sampling rate of the analog to digital convertor of the programmable signal conditioner as a function of the RF signal bandwidth of the input channel using a processor/mux of the generic adaptable reconfigurable digital transmitter.

15. The method of claim 14, further comprising specifying another RF bandwidth of another input channel; and
selecting another analog to digital sampling rate of another analog to digital convertor of the programmable signal conditioner as a function of the another RF bandwidth of the another input channel using the processor/mux of the generic adaptable reconfigurable digital transmitter.

16. An apparatus, comprising a generic adaptable reconfigurable digital receiver module having a programmable signal conditioner, wherein the programmable signal conditioner includes a digital to analog convertor programmed with a digital to analog sampling rate to define, at least in part, a specific adapted configuration for the generic adaptable reconfigurable digital receiver module including the digital to analog sampling rate as a function of a signal bandwidth of the programmed digital to analog convertor.

17. The apparatus of claim 16, wherein the programmable signal conditioner includes another digital to analog convertor programmed to define, at least in part, the specific adapted configuration, the generic adaptable reconfigurable digital receiver module including at least two channels.

18. The apparatus of claim 16, further comprising CMTS(s) and Edge-QAM(s) co-located with the generic adaptable reconfigurable digital receiver module at a node.

19. A method, comprising configuring a generic adaptable reconfigurable digital receiver having a programmable signal conditioner having a digital to analog convertor including
specifying a number of output RF channels from the generic adaptable reconfigurable digital receiver;
specifying an RF signal bandwidth of an output channel; and
selecting a digital to analog sampling rate of the digital to analog convertor of the programmable signal conditioner as a function of the RF signal bandwidth of the output channel using a processor/demux of the generic adaptable reconfigurable digital receiver.

20. The method of claim 19, further comprising specifying another RF bandwidth of another output channel; and
selecting another digital to analog sampling rate of another digital to analog convertor of the programmable signal conditioner as another function of the another RF bandwidth of the another output channel using the processor/demux of the generic adaptable reconfigurable digital receiver.

* * * * *